May 24, 1932. W. S. FISHER 1,859,662
TIRE CARRIER
Filed Jan. 10, 1929 2 Sheets-Sheet 1
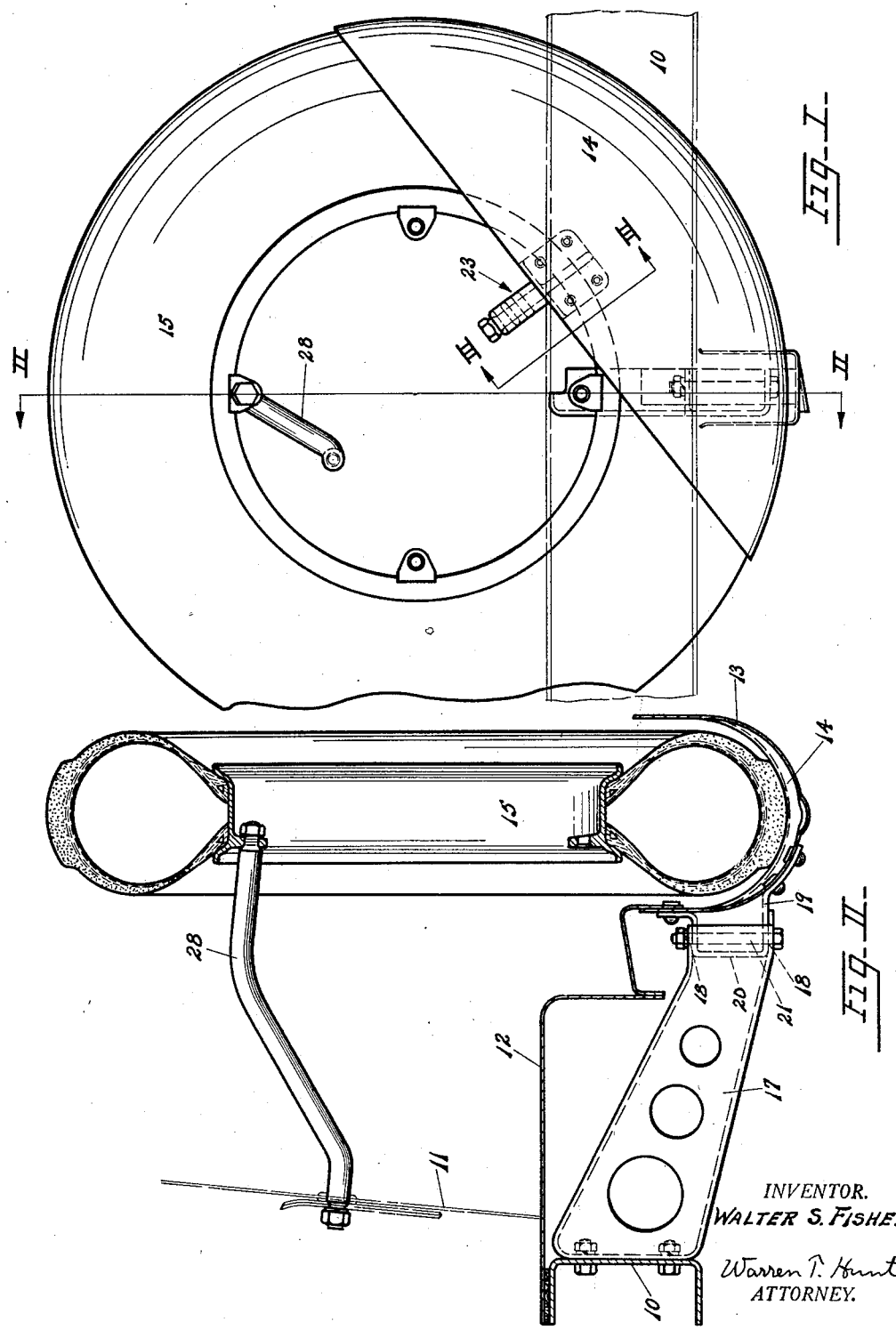
INVENTOR.
WALTER S. FISHER
Warren T. Hunt
ATTORNEY.

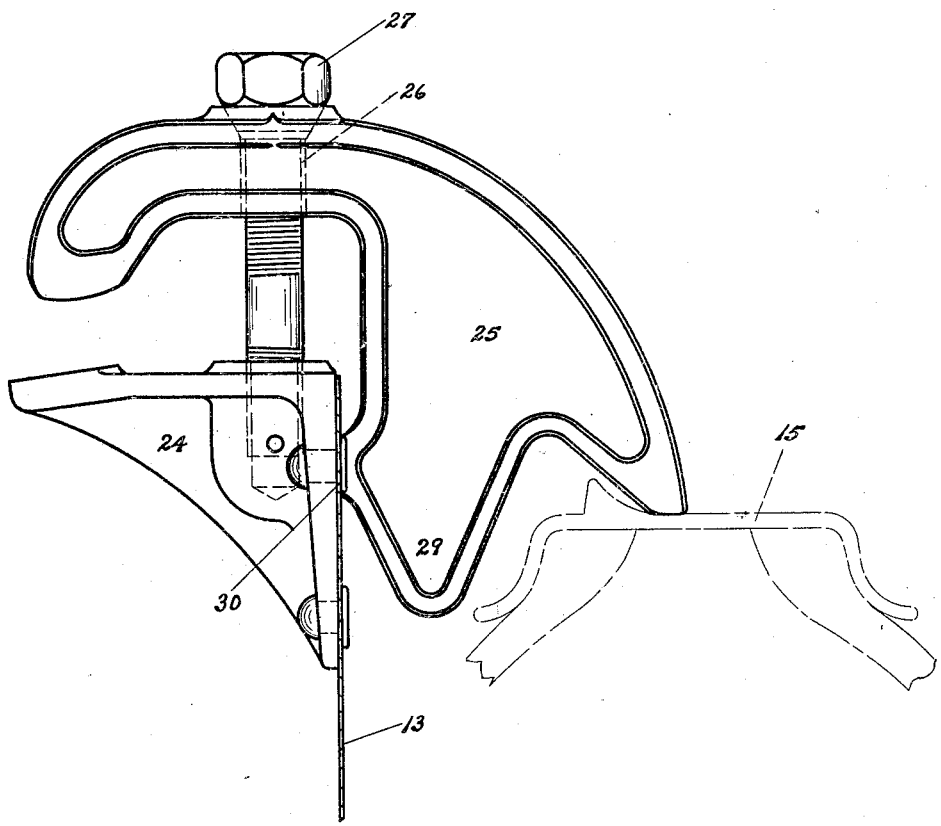
Fig. III.

Patented May 24, 1932

1,859,662

UNITED STATES PATENT OFFICE

WALTER S. FISHER, OF TOLEDO, OHIO, ASSIGNOR TO THE WILLYS-OVERLAND COMPANY, OF TOLEDO, OHIO, A CORPORATION OF OHIO

TIRE CARRIER

Application filed January 10, 1929. Serial No. 331,613.

My invention relates to tire carriers for automobile vehicles and it has particluar application to carriers of the above designated character which are adapted to support the tire unit in the front fender.

One of the objects of my invention is to provide an improved fender re-enforcement which is simple and economically adaptable to present day fender structures.

A further object of my invention is to provide a front fender type of carrier, wherein the tire unit is rigidly secured in position by a single clamp member.

It is a further object of the invention to provide a tire carrier which is relatively free from visible structural elements for maintaining the tire in position.

These, together with other objects will become more apparent by referring to the drawings and description specifically related thereto.

Figure I is an elevational view of an embodiment of my invention which may be preferred.

Fig. II is a sectional view taken along the line II—II in Figure I and illustrates the relation which the tire carrier elements bear to the associated elements of the automobile vehicle; and, Fig. III is a sectional view on an enlarged scale, taken along the line III—III in Figure I and illustrates in detail the structure of the clamp member.

A vehicle embodies a frame that is constructed of channeled members 10, one being illustrated in Fig. II, to which is secured sheet metal portions of the body including a cowl 11, splasher 12 portions, as well as others not shown. Adjoining the splasher portion is a fender 13, having an indenture, or well, portion 14 for receiving a tire unit 15, the fender being secured to the frame in the conventional manner. In addition, there is provided an auxiliary support for re-enforcing the fender and assuring ample rigidity to carry the tire unit safely.

The auxiliary re-enforcement consists of a channeled arm 17 that is bolted to the channeled longitudinal frame member 10 and is provided with holes 18 in its flanges near the extremity of the arm. A strap member 19 is riveted to the well portion of the fender and includes an ear 20 having spaced horizontal segments which fit within the flanges of the channeled arm 17. The ear is likewise provided with holes which mate with the holes 18 in the channeled arm to receive a bolt 21 that maintains the strap and arm rigidly secured together.

A clamp mechanism 23 is secured to the fender adjacent the strap which includes a tapped forging 24 that is riveted to the fender and a claw 25 that overhangs the well and is slidably disposed against the lateral portion of the well. The claw is provided with a hole 26 to receive a clamping bolt 27 that fits the tapped hole in the forging 24. The extremity of the claw engages the rim of the tire unit whereas the adjoining portion 29 of the claw engages the lateral portion of the well at 30. It will be apparent that as the claw is screwed downwardly the extremity of the claw will urge the unit downwardly, and the adjoining portion will urge the tire unit against the outer lateral portion of the well. In order to overcome the tendency of the upper portion of the tire to sway, a rod 28 is provided which is joined at one end to the rim and at the other to the adjacent portion of the body, preferably an element integral with the frame.

It will be apparent that by my invention I have provided a re-enforcement for the fender, composed of elements that may be fabricated cheaply and which may be assembled readily. It will be noted further, that the carrier is of a design whereby the tire unit is clamped in position at one point; and that there is a marked absence of structural elements that characterize tire structures which traverse and enclose about the tire unit. The tire may be clamped into position without difficulty and with very few operations. Furthermore, the clamping members are of such a nature as to permit the adoption of conventional locking devices.

Although I have illustrated and described but a single embodiment of my invention, it will be apparent to those skilled in the art that the principles of the same may be applied to many embodiments without departing from the spirit thereof, and I desire, therefore, that it be limited only as indicated in the appended claims.

I claim:

1. A vehicle tire carrier of the class described comprising a frame including a longitudinal channel member, a fender having an indentured portion for receiving a tire unit, means for maintaining the tire unit securely within the indentured portion, and means for re-enforcing the fender including a channel arm secured to the longitudinal channel member and extending laterally thereof, a strap screwed to the base of the indentured portion of the fender, said strap having an ear portion formed therein and disposed between the flanges on the channel arm, and means for securing the strap rigidly to the arm.

2. A vehicle tire carrier of the class described, comprising a frame including a longitudinal channel member, a fender having an indentured portion for receiving a tire unit, means for maintaining the tire unit securely within the indentured portion, and means for re-enforcing the fender including an arm secured to the longitudinal channel arm and extending laterally thereof, the end of said arm having formed integrally therewith, a pair of horizontal flanged members, a strap secured to the base of the indentured portion of the fender, said strap having an ear portion including a pair of horizontally extended surfaces adapted to engage the flange portions of the arm member, and means for securing the strap rigidly to the arm.

In testimony whereof, I affix my signature.

WALTER S. FISHER.